United States Patent
Lai

(10) Patent No.: US 9,553,464 B2
(45) Date of Patent: Jan. 24, 2017

(54) IN-VEHICLE-MOUNTED CHARGING DEVICE

(71) Applicant: HON HAI PRECISION INDUSTRY CO., LTD., New Taipei (TW)

(72) Inventor: Chih-Chen Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 270 days.

(21) Appl. No.: 14/301,484

(22) Filed: Jun. 11, 2014

(65) Prior Publication Data

US 2014/0361731 A1    Dec. 11, 2014

(30) Foreign Application Priority Data

Jun. 11, 2013    (TW) .............................. 102120706 A

(51) Int. Cl.
*H02J 7/00*    (2006.01)

(52) U.S. Cl.
CPC ...... *H02J 7/0047* (2013.01); *H02J 2007/0049* (2013.01); *H02J 2007/0062* (2013.01)

(58) Field of Classification Search
CPC ............ H02J 5/005; H02J 17/00; H02J 7/025; H02J 7/0042; H02J 7/0055; H02J 7/0013; H02J 7/0052; H02J 7/0054; H02J 7/35; H02J 50/12; H02J 7/045; H02J 2007/0062; H02J 7/0027; H02J 7/007
USPC .................................................. 320/106–115
See application file for complete search history.

(56) References Cited

U.S. PATENT DOCUMENTS

| | | | |
|---|---|---|---|
| 2004/0169489 A1* | 9/2004 | Hobbs ................... | B60L 3/0046 320/104 |
| 2011/0148354 A1* | 6/2011 | Wenger .................... | B60K 6/24 320/109 |
| 2014/0077766 A1* | 3/2014 | Takeuchi ............... | G06Q 30/06 320/128 |

* cited by examiner

*Primary Examiner* — Binh Tat
(74) *Attorney, Agent, or Firm* — Zhigang Ma

(57) ABSTRACT

A vehicle-mounted charging device includes a charging main body, an external module, an electric wire, and a lighting module. The charging main body includes a circuit board in a first shell, a power plug, and a first shell. A power socket of a vehicle connects to the circuit board. The external module includes a charging plug and a second shell. The charging plug is arranged in the second shell. The charging plug connects to a charging socket of an electronic device to recharge a battery of the electronic device. The electric wire is configured to electrically connect to the charging main body, the external module, and the lighting module to visually indicate the state of charge of the battery of the electronic device.

3 Claims, 1 Drawing Sheet

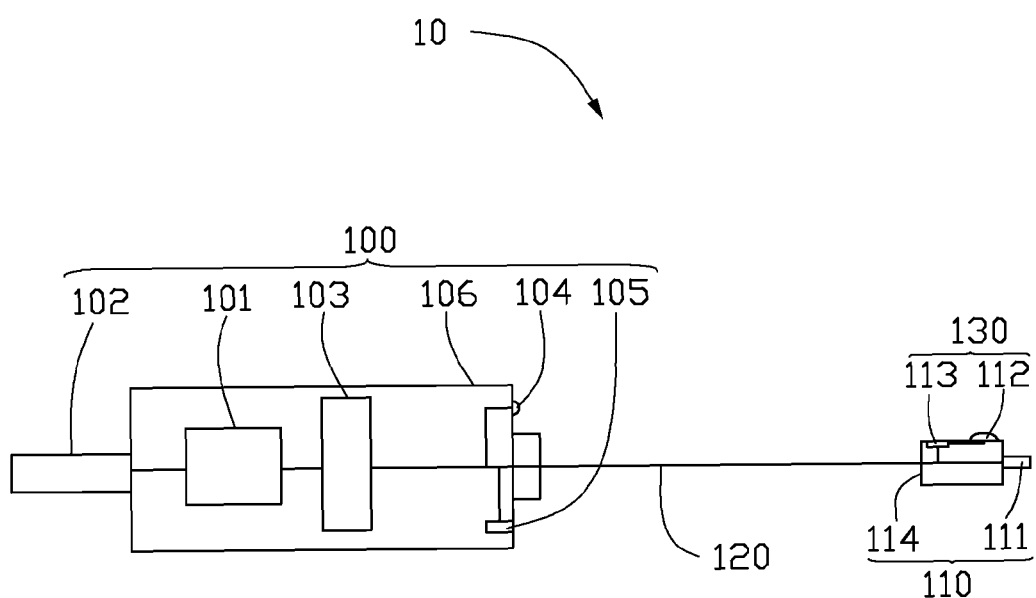

IN-VEHICLE-MOUNTED CHARGING DEVICE

FIELD

The present disclosure relates to vehicle-mounted devices.

BACKGROUND

A charging device is necessary in any field where rechargeable batteries are used.

BRIEF DESCRIPTION OF THE DRAWINGS

Implementations of the present technology will be described, by way of example only, with reference to the attached FIGURE:

The FIGURE is a schematic diagram of a vehicle-mounted charging device.

DETAILED DESCRIPTION

Numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawing is not necessarily to scale and the proportions of certain parts have been exaggerated to better illustrate details and features of the present disclosure.

The present disclosure is described in relation to a vehicle-mounted charging device. The vehicle-mounted charging device comprises a charging main body, an external module, an electric wire, and a light module. The charging main body comprises a circuit board, a power plug, and a first shell. The circuit board is received in the first shell. The power plug is configured to connected a power socket of a vehicle (not shown), and the power plug is electrically connected to the circuit board. The external module comprises a charging plug and a second shell. The charging plug protrudes from the second shell. The charging plug is configured for being electrically connected to a charging socket of an electronic device. The electric wire having a first end and a second end, the first end electrically connected to the power plug of the charging main body, and the second end electrically connected to the external module. The light module comprises a lamp and a switch. The switch and the lamp are arranged on the second shell. The electric wire is also electrically connected to the switch. The switch is electrically connected to the lamp. The lamp is configured for providing illumination. The switch is configured to activate and deactivate the lamp.

The charging main body further comprises a current detecting module, a current indicating lamp, and a USB interface. The current detecting module is received in the first shell. The current detecting module is electrically connected to the circuit board. The current indicating lamp is arranged on the surface of first shell. The current indicating lamp is electrically connected to the current detecting module. Access to the USB interface is arranged on the surface of first shell. The USB interface is electrically connected to the current detecting module.

The current detecting module is configured for detecting the output current of the USB interface and an output current of the external module.

The current indicating lamp shows the state of charge of a battery, with red light or green light.

The USB interface is configured for connecting to the external electronic equipment.

The charging plug can be a micro-USB plug or a mini-USB plug.

FIG. 1 illustrates a vehicle-mounted charging device 10 according to an embodiment. The vehicle-mounted charging device 10 includes a charging main body 100, an external module 110, an electric wire 120, and a light module 130.

The charging main body 100 includes a circuit board 101, a power plug 102, a current detecting module 103, a current indicating lamp 104, a USB interface 105, and a first shell 106.

The circuit board 101 and the current detecting module 103 are received in the first shell 106. The circuit board 101 is a processing center for electrical power into and from the vehicle-mounted charging device 10. The power plug 102 is configured to connected a power socket of a vehicle (not shown), and the power plug 102 is electrically connected to the circuit board 101. The current detecting module 103 is electrically connected to the circuit board 101. The current detecting module 103 is configured for detecting a output current of the USB interface 105 and an output current of the external module 110. The current indicating lamp 104 is electrically connected to the current detecting module 103. The current indicating lamp 104 shows the state of charge of a battery, the current indicating lamp 104 emitting green light when the battery of the electronic device is fully charged. The current indicating lamp 104 is arranged on an outside surface of first shell 106. The USB interface 105 is electrically connected to the current detecting module 103. Access to the USB interface 105 is arranged on the surface of first shell 106. The USB interface 105 is configured for allowing the external electronic equipment (not shown) to be connected, and for charging the battery of the external electronic equipment.

The electric wire 120 is configured to electrically connect to the charging main body 100 and the external module 110. The electric wire 120 having a first end (not shown) and a second end (not shown), the first end electrically connected to the power plug 102 of the charging main body 100, and the second end electrically connected to the external module 110.

The external module 110 includes a charging plug 111 and a second shell 114.

The charging plug 111 protrudes from the second shell 114. The charging plug 111 is electrically connected to the current detecting module 103. The charging plug 111 is configured for electrically connecting a charging socket of an electronic device (not shown) and for thus charging the electronic device. In this embodiment, the charging plug 111 is a micro-USB plug. In another embodiment, the charging plug 111 can also be a mini-USB plug.

The light module 130 includes a switch 113 and a lamp 112. The switch 113 and the lamp 112 are arranged on the second shell 114. The electric wire 120 electrically connects to the switch 113. The switch 113 is electrically connected to the lamp 112. The switch 113 is configured to activate and deactivate the lamp 112. The lamp 112 is configured for providing illumination. In this embodiment, the lamp 112 is a light-emitting diode. The switch 113 is a touch switch. Once connected to the power socket of a vehicle (not shown), when the switch 113 is touched the lamp 112 is automatically lighted (to show a red or a green light, depending on the state of recharge), and the switch 113 being touched again, the lamp 112 is switched off.

In another embodiment, the switch 113 can also be a button switch or dimmer switch.

When the power plug 102 is connected to the power socket of a vehicle (not shown) and the electronic device needing to be charged is electrically connected to the USB interface 105 or to the charging plug 111, the electronic device is being charged, and then the current indicating lamp 104 emits red light. The current indicating lamp 104 emits green light when the charging of the electronic device is finished.

The present disclosure is described in relation to the embodiments shown, and the descriptions above are only examples. Many details are often found in the art such as the other features of a VEHICLE-MOUNTED CHARGING DEVICE. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims. It will therefore be appreciated that the embodiments described above may be modified within the scope of the claims.

The invention claimed is:

1. An in-vehicle-mounted charging device comprising:
   a charging main body comprising:
   a circuit board;
   a power plug for being received in a power socket located in a vehicle to provide a charging voltage and current;
   a first shell, the circuit board received in the first shell, the power plug configured to connect the power socket of the vehicle, and the power plug electrically connected to the circuit board;
   a current detecting module received in the first shell and electrically connected to the circuit board;
   an USB interface arranged on an outer surface of the first shell and configured for being electrically connected to a charging socket of a portable electronic device, the USB interface being electrically connected to the current detecting module; and
   a current indicating lamp arranged on the outer surface of the first shell and electrically connected to the current detecting module;
   an external module comprising a charging plug and a second shell, the charging plug protruding from the second shell, the charging plug configured for being electrically connected to the charging socket of the portable electronic device to charge the portable electronic device with the charging voltage and current through the USB interface;
   an electric wire having a first end and a second end, the first end electrically connected to the power plug of the charging main body, and the second end electrically connected to the external module, thereby electrically connecting the charging main body to the external module; and
   a light module comprising a lamp and a switch, wherein the switch and the lamp are arranged on the second shell, the electric wire is electrically connected to the lamp and switch, the switch is electrically connected to the lamp, the lamp is configured for providing illumination, and the switch is configured to activate and deactivate the lamp;
   wherein the current indicating lamp shows a state of charge of the portable electronic device when either the USB interface or the charging plug is electrically connected to the charging socket of the portable electronic device.

2. The device of claim 1, wherein the current detecting module is configured for detecting an output current of the USB interface and an output current of the external module.

3. The device of claim 1, wherein the current indicating lamp shows the state of charge with red light or green light.

* * * * *